United States Patent
Sugata et al.

(10) Patent No.: US 6,726,412 B2
(45) Date of Patent: Apr. 27, 2004

(54) TOOL HOLDER FOR MACHINE TOOL, AND CUTTER AND TOOL DRIVER USED IN THE TOOL HOLDER

(75) Inventors: Shinsuke Sugata, Fukuyama (JP); Tadashi Makiyama, Onomichi (JP)

(73) Assignee: Horkos Corp., Fukuyama (JP)

( * ) Notice: Subject to any disclaimer, the term of this patent is extended or adjusted under 35 U.S.C. 154(b) by 0 days.

(21) Appl. No.: 10/239,788

(22) PCT Filed: Mar. 29, 2001

(86) PCT No.: PCT/JP01/02701

§ 371 (c)(1),
(2), (4) Date: Sep. 25, 2002

(87) PCT Pub. No.: WO01/74531

PCT Pub. Date: Nov. 10, 2001

(65) Prior Publication Data

US 2003/0103819 A1 Jun. 5, 2003

(30) Foreign Application Priority Data

Apr. 4, 2000 (JP) ........................................ 2000-102076

(51) Int. Cl.⁷ ................................................. B23B 5/06
(52) U.S. Cl. ....................... 408/57; 279/20; 408/239 A; 409/234
(58) Field of Search ............................. 279/20; 408/56, 408/57, 59, 239 A; 409/136, 232, 234

(56) References Cited

U.S. PATENT DOCUMENTS

| | | | | |
|---|---|---|---|---|
| 2,933,321 A | * | 4/1960 | Cascone | 279/20 |
| 3,024,030 A | * | 3/1962 | Koch | 279/20 |
| 3,443,819 A | * | 5/1969 | Benjamin et al. | 279/20 |
| 3,817,648 A | * | 6/1974 | Miller | 408/59 |
| 3,905,609 A | * | 9/1975 | Sussman | 279/20 |
| 4,080,090 A | * | 3/1978 | Kern | 408/59 |
| 5,405,220 A | * | 4/1995 | Ishikawa | 408/56 |
| 6,371,705 B1 | * | 4/2002 | Gaudreau | 409/234 |

FOREIGN PATENT DOCUMENTS

| | | | | |
|---|---|---|---|---|
| DE | 3814565 | * | 7/1989 | 408/57 |
| JP | 5-13476 Y2 | | 4/1993 | |
| JP | 5-29802 Y2 | | 7/1993 | |
| JP | 85518 | | 11/1993 | |
| JP | 46810 | | 6/1994 | |
| JP | 8-141878 A | | 6/1996 | |
| JP | 10-328912 A | | 12/1998 | |

* cited by examiner

Primary Examiner—Daniel W. Howell
(74) Attorney, Agent, or Firm—Venable LLP; John P. Shannon; Chad C. Anderson (57) ABSTRACT

A tool holder for machine tool capable of surely preventing the cutting fluid oil, fed into a passage through-hole (e) in a tool holder main body (1), from leaking the connection part between a cutter (10) and the tool holder during the machining of a workpiece; the cutter used in the tool holder; and a tool driver used in the tool holder; the tool holder for machine tool, comprising the passage through-hole (e) at the rotating center part (x) of the holder main body (1), allowing the cutter (10) having a cutting fluid path (e5) formed therein to be inserted into the front part of the passage through-hole (e), and being formed so that the cutter (10) is fixed by a fixing means (3) fitted to the tip of the holder main body (1), wherein a cylindrical female surface part for sealing (10b) is formed at the rear end part of the cutter (10), a cylindrical female surface part for sealing (e3a) allowing the cylindrical male surface part for sealing (10b) to be inserted closely therein is formed in the passage through-hole (e), a ring groove (h) is formed in the cylindrical female surface part for sealing (e3a), and a ring-shaped packing (12) for sealing an annular clearance between the cylindrical male surface part for sealing (10b) and the cylindrical female surface part for sealing (e3a) is fitted into the ring groove (h).

4 Claims, 10 Drawing Sheets

TOOL HOLDER FOR MACHINE TOOL, AND CUTTER AND TOOL DRIVER USED IN THE TOOL HOLDER

FIELD OF THE INVENTION

The present invention relates to a tool holder for machine tool and a tool driver used in the tool holder.

BACKGROUND OF THE INVENTION

Figure 8:
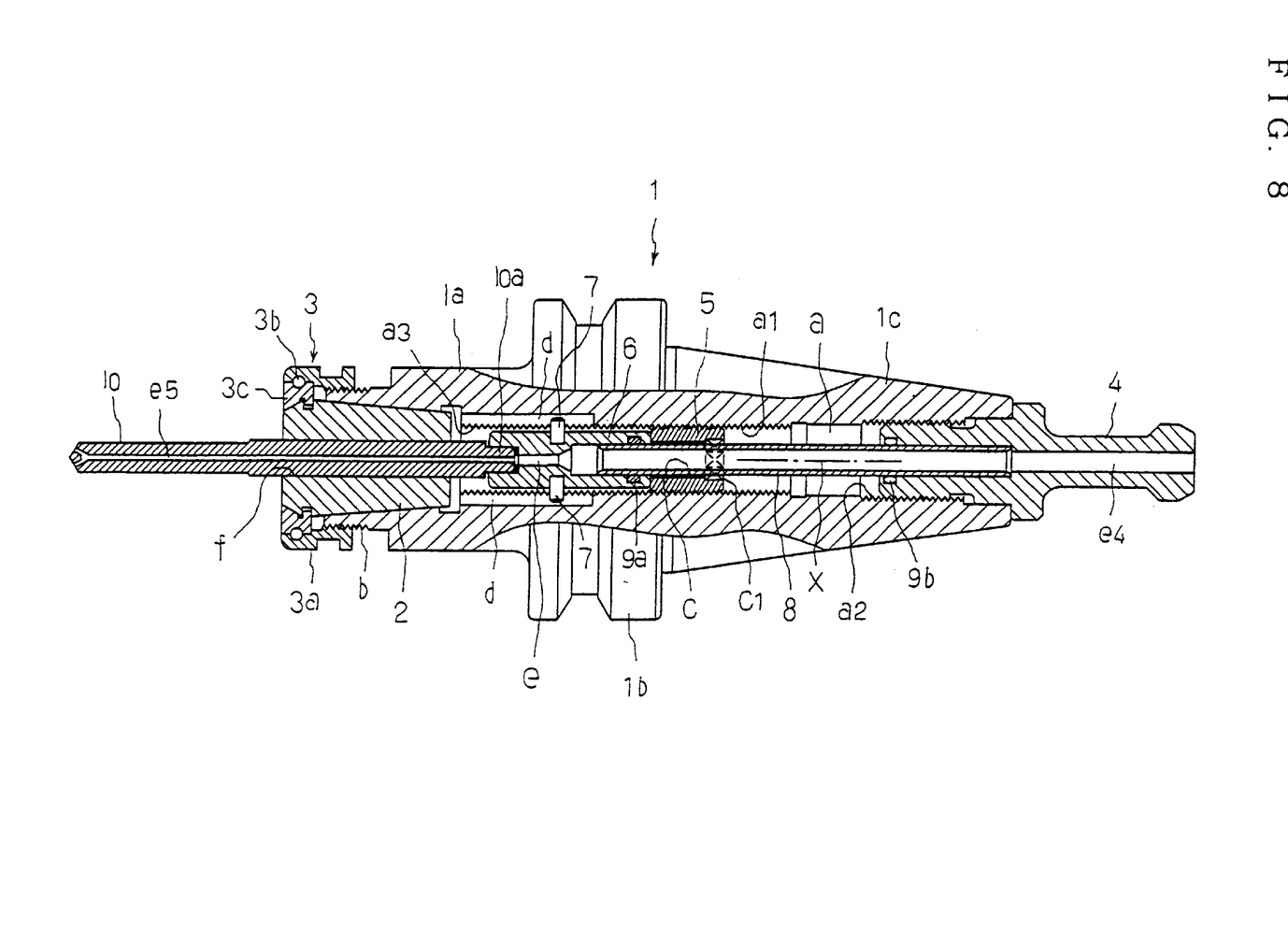
FIG. 8 is a vertical sectional view of a conventional tool holder.

A tool holder as shown in FIG. 8, which is attached or detached on a spindle of a machine tool, has been already existed. The outline configuration of the tool holder is as follows.

That is, 1 is a tool holder main body, and consists of a direct cylindrical shaft part 1a, a flange part 1b and a taper-shank part 1c. A through-hole "a" is formed in a rotating center part "x" of the tool holder 1, and female screw threads a1, a2 are formed in front and rear parts of the inner peripheral surface of the through-hole "a". Numeral 2 is a collet that is inserted into a taper hole of the direct cylindrical shaft part 1a. Numeral 3 is a collet fixing means that is fixed on a male screw thread "b" formed in the anterior outer peripheral surface of the direct cylindrical shaft part 1a, which consists of a nut body 3a, a ring rod member 3b and a combining member 3c. Numeral 4 is a pull-stud that is fixed on the posterior end of the taper-shank part 1c through the female screw thread a2.

Figure 9A:
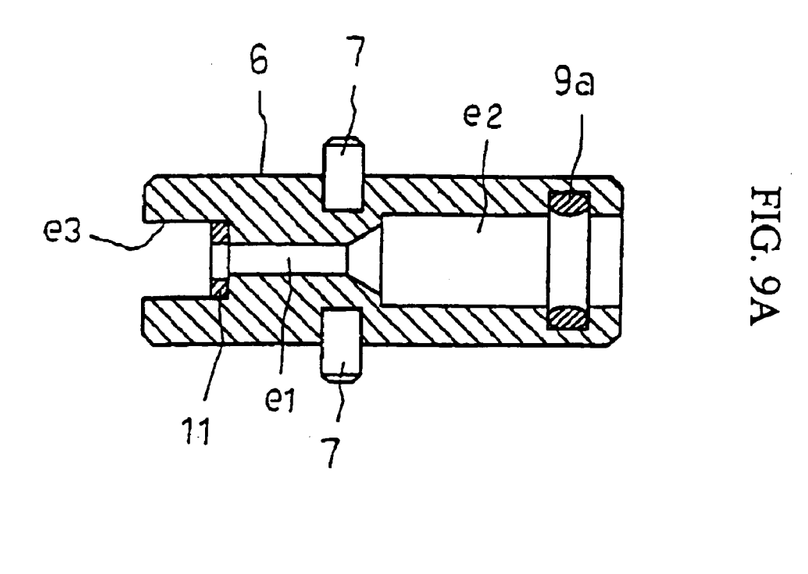
FIG. 9A is a front view thereof.
Figure 9B:
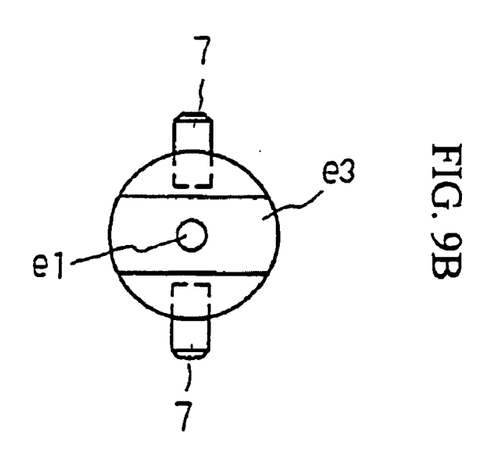
FIG. 9B is a vertical sectional view thereof.

Numeral 5 is an adjusting screw, which has a male screw thread formed in the outer peripheral surface and is installed on the middle of the length of the female screw thread a1 as the front and rear positions can be adjusted. A through-hole "c" is formed in the center of the adjusting screw 5, and the posterior part of a through-hole "c" is formed into hexagon hole c1. To the inside of a through-hole part a3 of a front side of the adjusting screw 5, a tool driver 6 shown in FIG. 9 is inserted closely and slidably in longitudinal direction.

An outer peripheral surface of the tool driver 6 is formed in smoothing surface, and driver pins 7, 7 protrude on the peripheral surface part of the tool driver 6 facing to its diameter direction. The driver pins 7, 7 are guided by guide rails "d", "d" which are formed in an inner peripheral surface of the through-hole part 3a. Partial passage through-holes e1, e2, e3 which form a part of a below-mentioned passage through-hole formed in the rotating center part "x" of the holder main body 1 are provided to the center of the tool driver 6.

Numeral 8 is a cutting liquid communicating tube. A front end thereof is airtightly inserted into the partial passage through-hole e2 through an O ring, and on the other hand, a back end thereof is airtightly inserted into the anterior part of the central hole e4 of the pull-stud 4 through an O ring.

Figure 10:
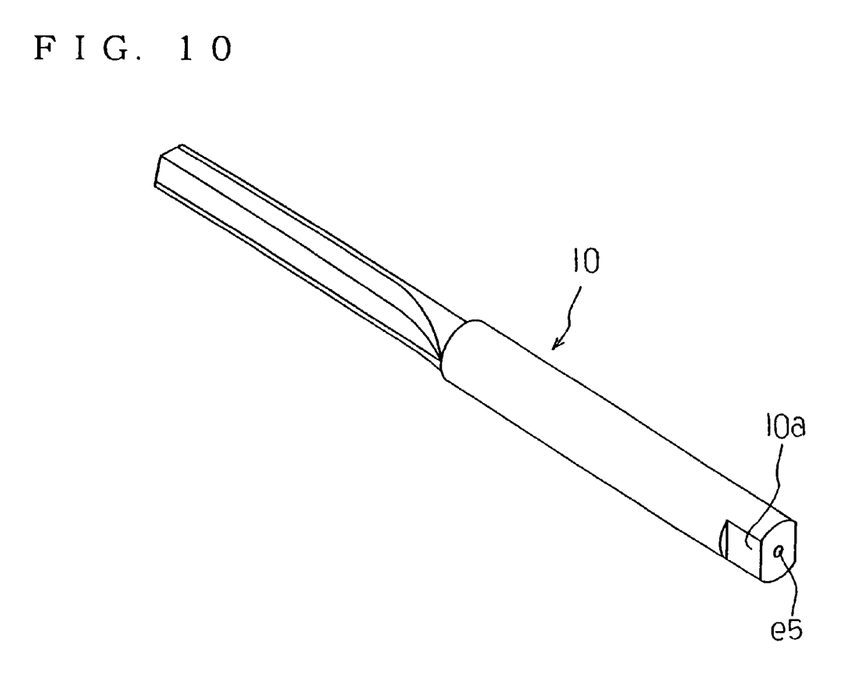
FIG. 10 is a view showing a conventional cutter.

Numeral 10 is a cutter having a cutting fluid path e5 with a small diameter to the center of its main body. The cutter 10 is inserted into the through-hole part a3 of the holder main body 1 and a fitting female part forming the partial passage through-hole e3 in the forefront position of the tool driver 6 by way of the central hole "f" of the collet 2. As shown in FIG. 10, a peripheral surface notching part 10a called a tongue etc. is formed on a posterior part of the cutter 10. In this case, the fitting female part e3 is what a diameter part of a front end of the tool driver 6 is cut in the shape of a groove. A rubber packing 11 is pasted down a bottom surface of the fitting female part e3 with adhesives.

When equipping the holder main body 1 with the cutter 10 of the tool holder, first the nut body 3a of the collet fixing means 3 is loosened to make the collet 2 in the open status. Then, the bottom of the cutter 10 is inserted from the collet 2 front side by way of a central hole "f" of the collet 2, and the peripheral surface notching part 10a is fitted on the fitting female part e3. In this case, a back end surface of the peripheral surface notching part 10a is pressed to the rubber packing 11 at the bottom of the fitting female part e3. This status is held, and the nut 3a is clamped tight.

Therefore, the cutter 10 is fastened to the holder main body 1 through the collet 2, and the cutting fluid path e5 of the cutter 10 and the partial passage through-holes e1, e2, e3 of the tool driver 6 are communicated airtightly.

While using the tool holder, cutting fluid mist or cutting fluid supplied from a spindle side of the machine tool passes through the central hole e4 of the pull-stud 4, and thereafter reaches the passage through-hole "e" of the holder main body comprising the cutting fluid communicating tube 8, the partial passage through-holes e1, e2, e3, and the through-hole part a3. Furthermore, it passes through the cutting liquid path e5 of the cutter 10, spouts from an opening of the tip thereof, and lubricates a friction part of the cutter 10 to a work.

There are the following troubles in the tool holder of the conventional machine tool.

That is, when equipping the holder main body 1 with the cutter 10, it is required to push backward the cutter 10 with sufficient force, to press the back end surface of the peripheral surface notching part 10a to the rubber packing 11 at the bottom of the fitting female part e3, and to clamp the collet fixing means 3 as holding this status. If thus attaching operation is not performed completely, the cutting fluid mist or the cutting fluid leaks from the part of the rubber packing 11 during a machining.

Besides, when the collet fixing means 3 fastens insufficiently the cutter 10 due to a certain cause, relative rotation of the cutter 10 to the holder main body 1 can not be regulated by any effect any longer, and processing by this cutter 10 can not continue.

Besides, when pressing the tool holder to the work strongly, the cutter 10 tends to slide backward to the collet 2. In this case, since the rubber packing 11 catches the back end of the cutter 10, the cutter 10 is not surely prevented from moving, and sometimes moves backward to the spindle. Accordingly, it is feared that machining accuracy may be injured.

An object of the present invention is to provide a tool holder for machine tool and a tool driver etc., which can solve the above-mentioned troubles.

SUMMARY OF THE INVENTION

The present invention relates to a tool holder for machine tool as follows. Plural guiding grooves parallel to a spindle direction are provided on the inner peripheral surface of a through-hole at a rotating center part of a tool holder main body. A tool drive that regulates relative rotation with the holder main body and can control front and rear positions by sliding along the spindle direction is assembled by the guiding grooves. A partial passage through-hole forming a part of the through-hole is formed at the rotating center part of the tool driver. A cutter comprises a cylindrical male surface part for sealing formed on the rear-outer peripheral part, a male surface part for regulating rotation comprising plane surface bodies formed at the front of it, and a half-moon shaped plane part formed at each front edge of them. Instead of the male surface part for regulating rotation and the half-moon shaped plane part, a groove for regulating longitudinal move comprising plane surfaces and half-shaped plane parts of the front and rear edges thereof may be formed. Here, the male surface part for regulating rotation is formed by cutting a fixed range of peripheral surface of the cutter, and the groove for regulating longitudinal move is formed by cutting a fixed range of the peripheral surface in concave shape. To the front-inner peripheral surface of the partial passage through-hole of the tool driver, a cylindrical female surface part for sealing to seal up the cylindrical male surface part for sealing of the cutter, and a fitting female part regulating relative rotation by fitting the plane surface bodies of the male surface part for regulating rotation or the concave of the groove for regulating longitudinal move. A barrier surface of the fitting female part contacts on the half-moon shaped plane part, thereby regulating relative rotation in longitudinal direction. A ring groove is formed to the inner peripheral surface of the cylindrical female surface part for sealing, and a ring-shaped packing for sealing an annular clearance between the cylindrical male surface part for sealing and the cylindrical female surface part for sealing is fitted into the ring groove.

According to this, the passage through-hole of the holder main body and the cutting fluid path of the cutter are airtightly communicated through the cylindrical male surface part for sealing, the cylindrical female surface part for sealing and the ring-shaped packing. This communicating status is not spoiled even if an amount of insertions changes within the comparatively large range. In this case, the tool driver is incorporated into the passage through-hole, by changing the front and rear positions of the tool driver, the length that the cutter protrudes from the front end of the holder main body can be changed arbitrarily.

The tool driver forms the partial passage through-hole comprising a part of the passage through-hole of the holder main body to the center thereof. To the anterior part of the partial passage through-hole are formed the cylindrical female surface part for sealing into which the cylindrical male surface part for sealing of the cutter is airtightly inserted through the O ring or its equivalent and the fitting female part which relative rotation is regulated by fitting the male surface part for regulating rotation, which a range of the peripheral surface is cut into the plane surface bodies or the groove part for regulating longitudinal move. On the other hand, to the posterior part of the partial passage through-hole is fitted the ring-shaped packing to insert the cutting fluid communicating tube airtightly. Besides, in the center of the outer peripheral surface part thereof is provided a driver pin which is engaged with the guiding groove engraved on the inner peripheral surface of the through-hole of the holder main body.

BRIEF DESCRIPTION OF THE DRAWINGS

FIG. 3 shows a tool drive of a tool holder.

FIG. 6 shows a tool driver and attachments thereto.

FIG. 9 shows a conventional tool driver.

PREFERRED EMBODIMENT OF THE INVENTION

Hereafter, one example of the present invention is explained with reference to FIGS. 1 to 3.

Here, the same sign is given to the same site as the thing of the conventional example among these figures.

The characteristic feature of the tool holder of the present invention is explained as follows. Namely, as shown in FIG. 2, a male surface part for regulating rotation 10a of a peripheral surface notching part and a cylindrical male surface part for sealing 10b are arranged in order inside the posterior part of a cutter 10.

The cylindrical male surface part for sealing 10b is formed into what has a straight cylindrical peripheral surface along a cutter center-of-rotation line. The male surface part for regulating rotation 10a, as shown in FIG. 2, comprises two parallel flat surface bodies "g", "g" for regulating rotation in parallel to the cutter center-of-rotation, which are what a part of periphery of the cutter main body with a circular cross section is cut and arranged in an opposite state that sandwiches the cutter center-of-rotation line.

Though a drill is shown in the figures as a representative example of the above-mentioned cutter 10, it may not be limited to this. This may be a reamer, a tap, an end mill, a gun drill, a gun reamer, etc.

One end of the cutting fluid path e5 of the cutter 10 opens at the back end surface of the cutter main body (namely, the back end surface of the cylindrical male surface part for sealing 10b), and the other end opens at the front end surface thereof. In this case, the cutting fluid path e5 may be single or plural, and it does not interfere that it may be branched in a plurality like the example of illustration.

Figure 1:
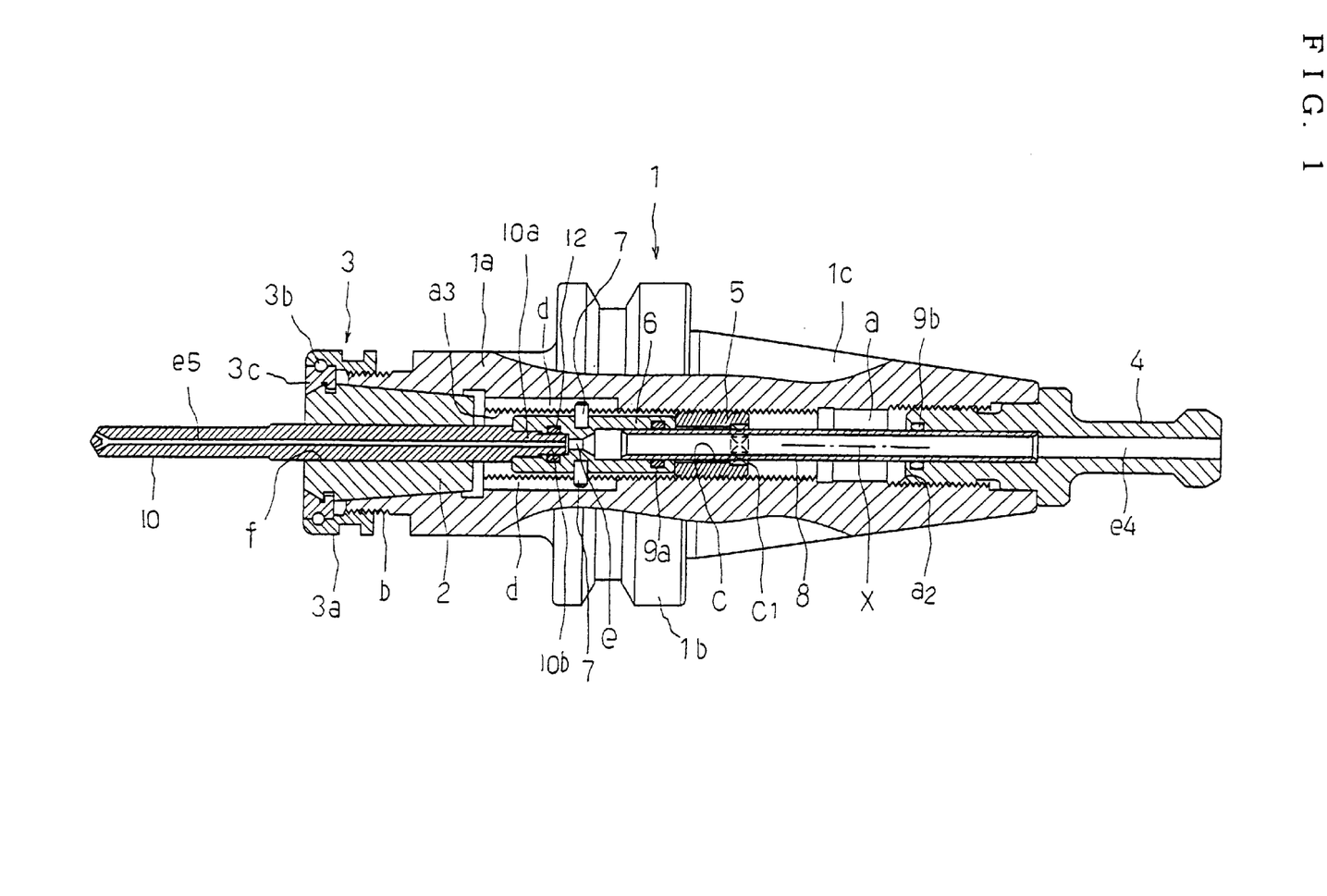
FIG. 1 is a vertical sectional view of a tool holder for machine tool in the present invention.
Figure 2:
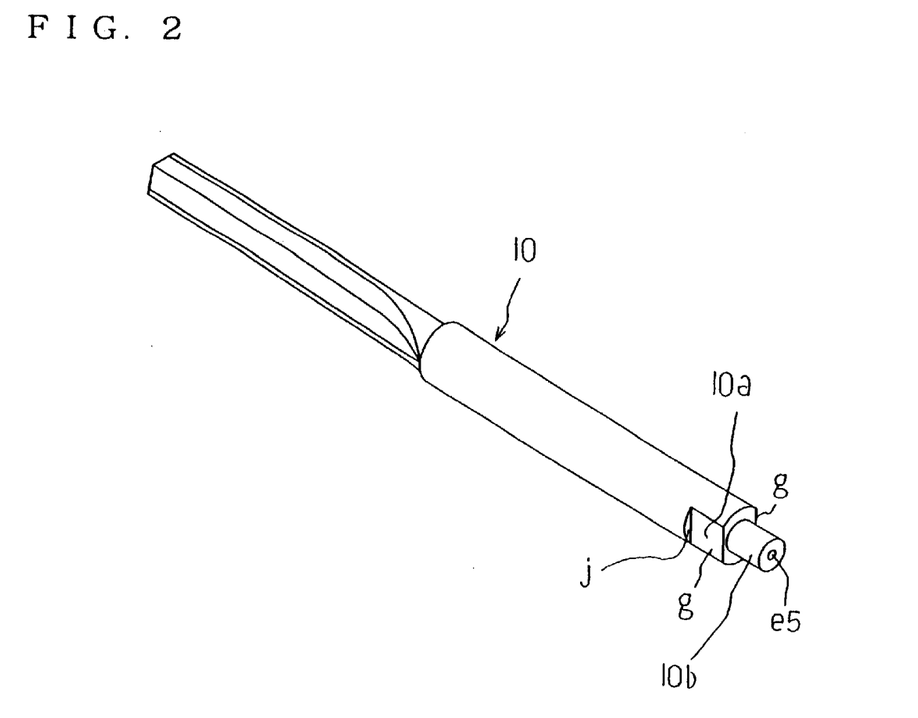
FIG. 2 is a perspective view of a cutter to be fitted to the tool holder.
Figure 3A:
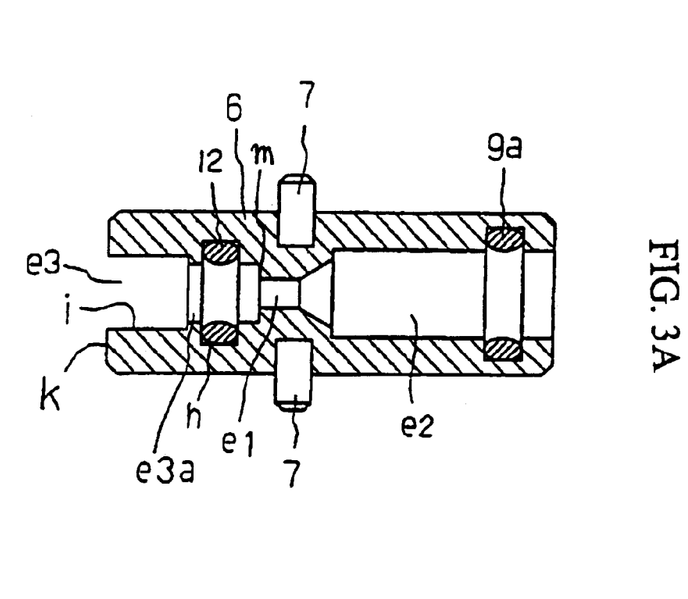
FIG. 3A is a front view and FIG. 3B is a vertical sectional view.
Figure 3B:
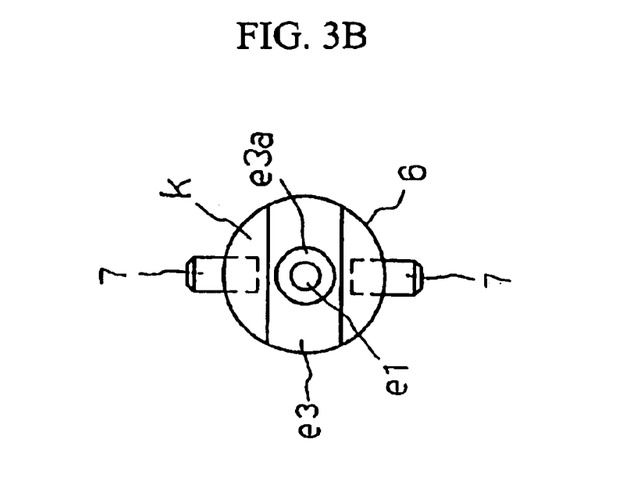

Moreover, as shown in FIGS. 1 and 3, the cylindrical female surface part for sealing e3a into which the cylindrical male surface part for sealing 10b is inserted and the fitting female part e3b into which the male surface part for regulating rotation 10a is internally fitted are arranged to the anterior part of the partial passage through-hole e1 of the tool driver 6 with order arrangement.

The cylindrical female surface part for sealing e3a is formed into a cylindrical hole of a big path for a while rather than the cylindrical male surface part for sealing 10b, and has ring groove "h" in the middle of the longitudinal direction of the inner peripheral surface thereof. A ring-shaped packing 12 is fitted into the ring groove "h". Though it is good to use an O ring like the example of illustration as the ring-shaped packing 12, it is not limited to this and it does not interfere even if it is what is applied to the O ring correspondingly (an O ring equivalent). Here, the O ring equivalent means what a form and a property approximate to the O ring. For example, a whole form is a ring shape, the cross section form in the middle of its length is a thing like a square or a hexagon except a circle, and the quality of the material is rubber or what has the seal nature and elasticity approximated to it.

The fitting female part e3b is as following. That is, as shown in FIG. 3 etc., a diameter part of the front end part of the tool driver 6 is cut more deeply than the longitudinal-direction length of the male surface part for regulating rotation 10a to form a fitting groove "i", and the cross-section form of the fitting groove "i" is applied to one of the male surface part for regulating rotation 10a.

As shown in FIG. 3, whole longitudinal-direction lengths of the fitting female part e3b and the cylindrical female surface part for sealing e3a are somewhat larger than ones of the cylindrical male surface part for sealing 10b and the male surface part for regulating rotation 10a, respectively. When inserting the cylindrical male surface part for sealing 10b and the male surface part for regulating rotation 10a into the fitting female part e3b and the cylindrical female surface part for sealing e3a respectively, an insertion relative displacement in longitudinal direction is regulated by connecting a cutter main body half-moon shaped plane part "j" formed at the front edge of the male surface part for regulating rotation 10a to a barrier surface "k" of the fitting female part e3b. Besides, a clearance is formed between the rear end of the cylindrical male surface part for sealing 10b and a bottom surface "m" of the cylindrical female surface part for sealing e3a.

In the tool holder of the present invention shown in FIG. 1, an exchanging of the cutter 10 is carried out as follows.

That is, when removing the cutter 10 from the holder main body 1, the nut 3a body is first turned to a loosening side to the holder main flame 1, and therefore, the collet 2 cancels a joint in the middle of the length of the cutter 10, and the cutter can move longitudinally inside the central hole "f" of the collet 2.

Then, the anterior approach part of the cutter 10 is grasped by hand, and the cutter 10 is given a drawing force. Therefore, the cutter 10 is pulled forward against a resistance force of the O ring to the relative displacement between the cylindrical male part for sealing 10a and the cylindrical female part for sealing e3a.

On the other hand, when attaching the cutter 10, the cutter main body is inserted into the central hole "f" of the collet 2, thereafter screwing it to the holder main body 1. In this case, the cutter 10 is squeezed so as to apply the diameter direction of the male surface part for regulating rotation 10a to one of the fitting groove "i" of the fitting female part e3b. Therefore, the cylindrical male surface part for sealing 10b is inserted into the cylindrical female surface part for sealing e3a against the resistance force of the O ring 12. And besides, the male surface part for regulating rotation 10a is fitted into the fitting female part e3b in the state that the relative rotation is regulated.

When the cylindrical male surface part for sealing 10b and the male surface part for regulating rotation 10a are completely inserted into the cylindrical female surface part for sealing e3a and the fitting female part e3b, the half-moon shaped plane part "j" of the cutter 10 is contacted to the barrier surface "k" of the tool driver 6 in the state of metallic contact as shown in FIG. 1. And the insertion beyond it will be regulated. Thereafter, the nut body 3a is screwed, and therefore the cutter 10 is connected by the collet, and the attaching is finished.

In using the above-mentioned tool holder, for example, a taper-shank part 1c is inserted into a taper hole of the spindle of the machining center. In this state, the tool holder is fixed to the spindle through the pull-stud 4 in the state that an escape is regulated. Under this fixed state, the tool holder is rotated together with the spindle and moved longitudinally if needed. And from a spindle side, cutting fluid mist or cutting fluid is supplied into the passage through-hole "e" of the holder main body 1 by way of the central hole e4 of the pull-stud 4.

When the cutter 10 comes to cut a workpiece, though the rotation driving force of the spindle will be transmitted to the cutter 10, the transmission is mainly transmitted to the cutter 10 through the collet 2 from the holder main body 1. In this case, when the big rotational resistance from the workpiece acts on the cutter 10, joint operation of the collet 2 is insufficient and the cutter 10 tends to rotate relatively to the holder main body 1. In this case, the rotation force of the holder main body 1 is transmitted to the cutter 10 necessary through a guide groove "d" of the holder main body 1, a driver pin 7, the fitting female part e3b of the tool driver 6 and the male surface part for regulating rotation 10a of the cutter 10. Then, the relative rotation of the cutter 10 to the holder main body 1 is prevented certainly.

Moreover, though a pushing pressure comes to be given to the cutter 10 from a cut object, the pressure is certainly supported by the metallic contact between the half-moon shaped plane part "j" and the barrier surface "k" of the tool driver 6. Therefore, the cutter 10 is prevented from the relative displacement in longitudinal direction to the holder main body 1.

On the other hand, though cutting fluid etc. tends to leak out from the contact place between the cutter 10 and the tool driver 6, the O ring 12 exists consolidatedly between the cylindrical male surface part for sealing 10b and the cylindrical female surface part for sealing e3a and fills air-tightly a clearance thereof. Therefore, the cutting fluid etc. can not flow to the outside of the O ring, and is certainly regulated from leaking out from the contact place between the cutter 10 and the tool driver 6.

In addition, when changing the amount of protrusion from the holder main body 1 of the cutter 10, for example, after being the state that longitudinal move of the cutter 10 is permitted, removing the pull-stud 4 from the holder main body 1 and further drawing out a cutting fluid communicating tube 8, a wrench is fitted to a hexagon socket of an adjusting screw 5, the adjusting screw 5 is screwed as required, and a longitudinal position thereof may be changed.

The tool holder of the above-mentioned example can be performed as follows.

Figure 4:
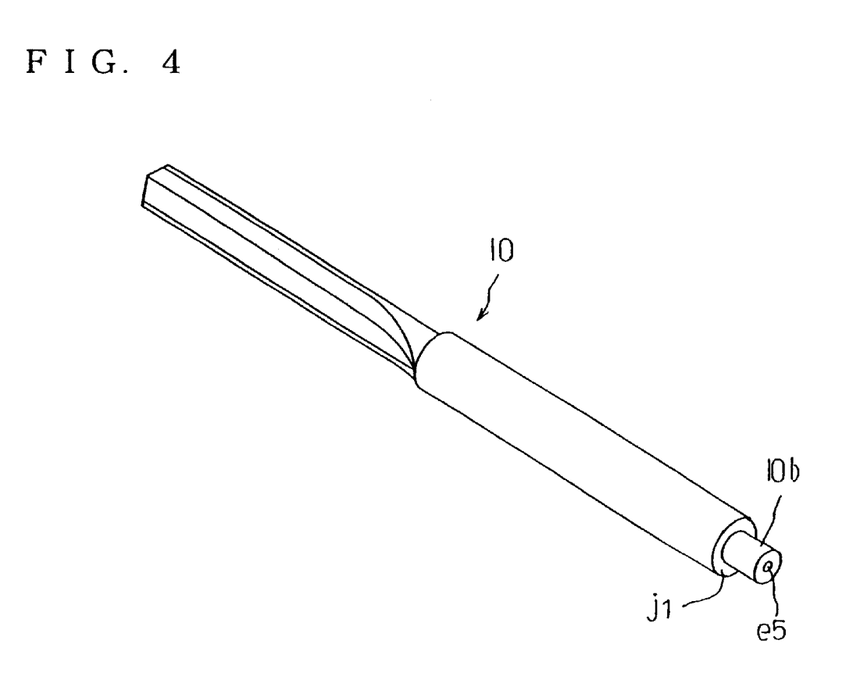
FIG. 4 is a view of a cuttter of the tool holder showing another modification.

The male surface part for regulating rotation 10a is formed into a square pole by cutting the part countering in each of the longitudinal direction and the cross direction of the peripheral surface of the cutter main body. And the fitting female part e3b is formed into a square socket corresponding to the male surface part 10a.

In this case, the male surface part for regulating rotation 10a and the cylindrical male part for sealing 10b are formed to the back end part of the cutter main body and the cutter point side rather than the male surface part for regulating rotation 10a, respectively. Correspondingly, the cylindrical female part for sealing e3a and the fitting female part e3b are formed to the front end part side of the tool driver 6 and the backside of the cylindrical female surface part for sealing e3a. According to this, an existing tap can be equipped as the cutter 10 concerning the present invention.

Figure 5:
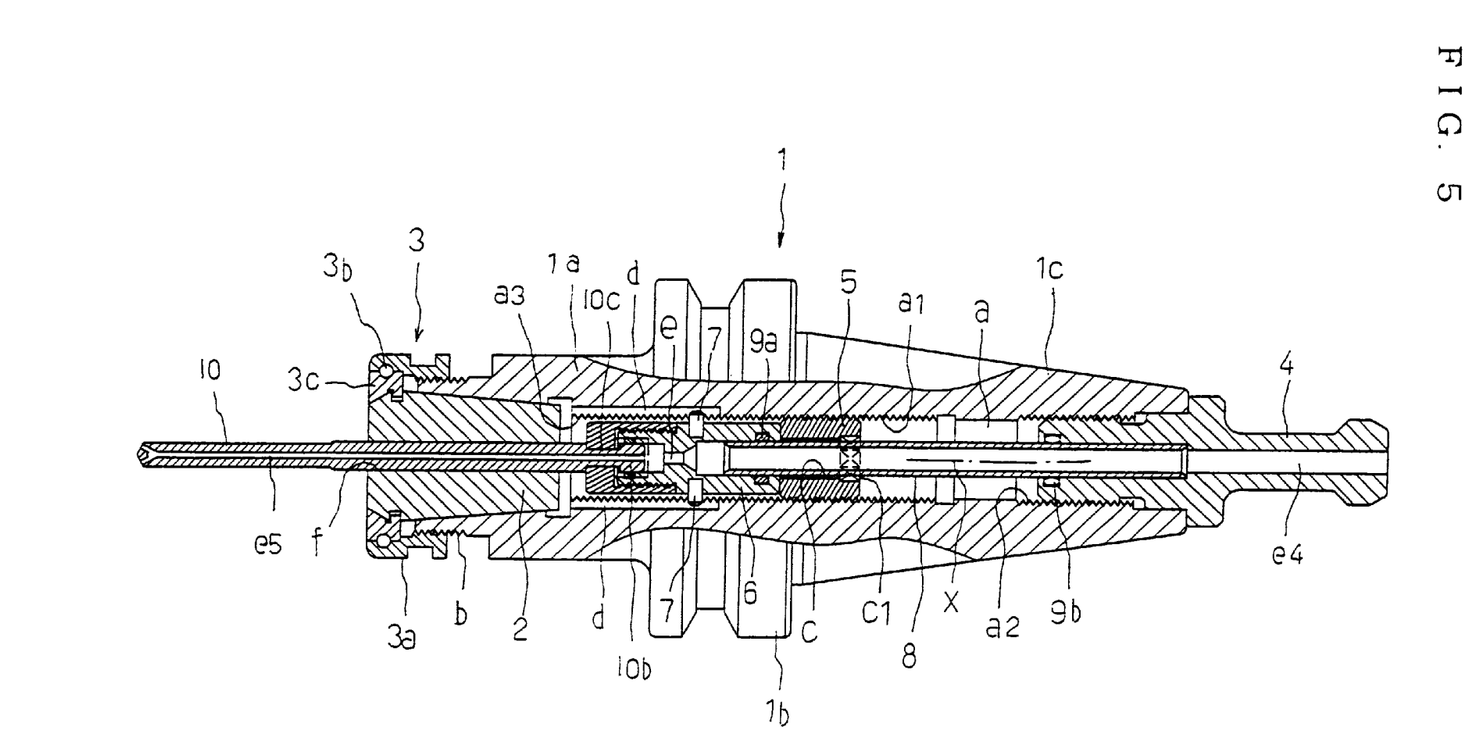
FIG. 5 is a vertical sectional view of a tool holder for machine tool of an alternate embodiment of the present invention.

Next, another example is explained with reference to FIGS. 5 to 7.

Here, the same sign is given to the same site as a thing as stated above among these drawings.

The characteristic feature of the tool holder concerning the example is explained as follows. The cutter 10 has the cylindrical male surface part for sealing 10b with the same diameter as the cutter main body to the back end part. Besides, a groove part for regulating longitudinal move 10c which is cut into a concave groove is formed the cutter tip side of the male surface part 10b.

To form these cylindrical male surface part for sealing 10b and the groove part for regulating longitudinal move 10c, for example, the peripheral surface part countering in the diameter direction in the rear end part of the cutter main body (the existing cutter is generally made with such a thing) whose rear is formed into a right circular cylinder with a same diameter is cut to form two parallel flat-surfaces n, n along the cutter center-of-rotation line. In this case, cutter main body half-moon shaped plane parts j2 of the front and back ends of the parallel two flat-surfaces "n", "n" serve as an operating part for regulating longitudinal displacement. Besides, a part on the backside groove part for regulating longitudinal move 10c of the cutter serves as the cylindrical male surface part for sealing 10b.

Figure 6A:
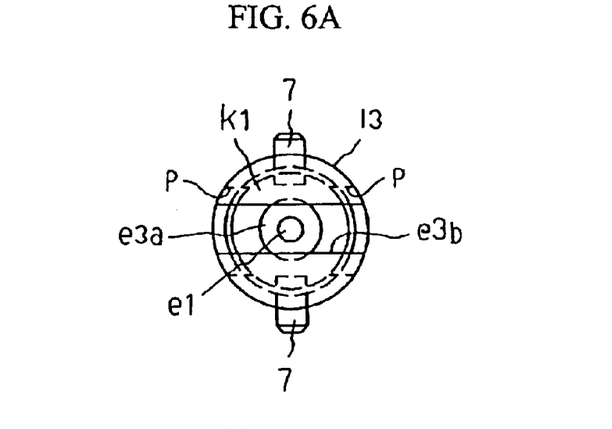
FIG. 6A is a front view thereof.
Figure 6B:
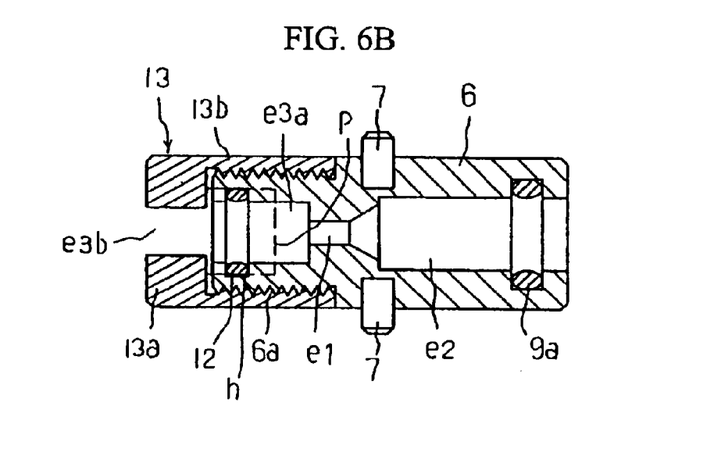
FIG. 6B is a vertical sectional view thereof.
Figure 6C:
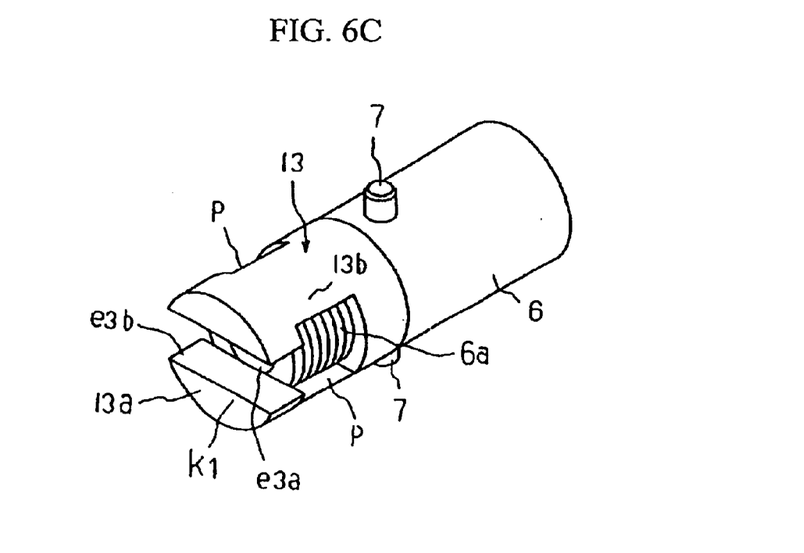
FIG. 6C is a perspective view thereof.
Figure 7:
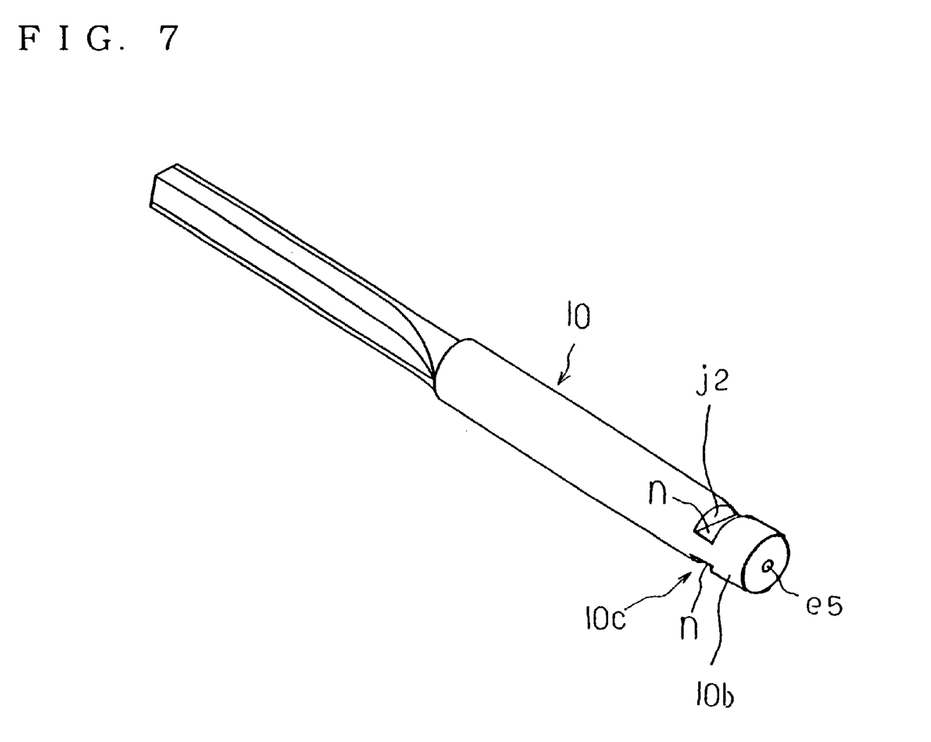
FIG. 7 is a perspective view of a cutter fitted to the tool holder of FIG. 5.

Moreover, as shown in FIG. 6, the cylindrical female surface part for sealing e3a into which the cylindrical male surface part for sealing 10b is inserted is formed to the anterior part of the partial passage through-hole e1 of the tool driver 6. Besides, a male screw thread 6a is formed to the anterior peripheral part of the tool driver 6.

The cylindrical female surface part for sealing e3a is formed into a cylindrical hole with a big diameter rather than the cylindrical male surface part for sealing 10b, and has ring groove "h" in the middle of the longitudinal direction of the inner peripheral surface. Then, the ring-shaped packing 12 is fitted to the ring groove "h". Though it is good to use an O ring like the example of illustration as the ring-shaped packing 12, it is not limited to this and it does not interfere even if it is what is applied to the O ring equivalent as well as the above-mentioned.

A nut body for cutter connection 13 having the fitting female part e3b into which the groove part for regulating longitudinal move 10c is internally fitted is screwed on the male screw thread 6a. The nut body for cutter connection 13, as shown in FIG. 6, is provided with a front wall 13a and a female screw wall 13b. A slit is formed in the specific diameter part of the front wall 13a as the fitting female part e3b. Besides, comparatively big square holes "p", "p" communicated with each edge of the slit e3b are formed to the opposite part of the female screw wall 13b.

In the tool holder of this example, for example, the cutter 10 is exchanged as follows.

When removing the cutter 10 from the holder main body 1, first the nut 3a and the collet 2 are removed from the holder main body 1 by hand operation, next, the cutter 10 is pulled to a front side, the tool driver 6 is drawn out from the cutting fluid communicating tube 8, and the tool driver 6 and the nut body for cutter connection 13 are removed from the holder main body 1 together with the cutter 10.

Then, the nut body for cutter connection 13 is turned together with the cutter 10, and displaced to the front side from the male screw thread 6a of the tool driver 6 more than a constant rate. When a square-hole "p" is separated from the male screw thread 6a, the groove part for regulating longitudinal move 10c is displaced to the slit e3b, and the cutter 10 is separated from the nut body for cutter connection 13.

On the other hand, when attaching the cutter 10 to the holder main body 1, the reverse of the procedure of the previous removal is performed.

In use of the above-mentioned tool holder, if the cutter 10 comes to cut a workpiece, although the rotation driving force of the spindle of the machine tool will be transmitted to the cutter 10, the transmission is transmitted to the cutter 10 from the holder main body 1 through the collet 2.

When a forward delivery force acts on the cutter 10 from the spindle, the cutter 10 comes to be pushed backward by pushing pressure of the workpiece. The pushing pressure is certainly supported by contacting of the half-moon shaped plane part j2 of the front end of the groove part for regulating longitudinal move 10c and the barrier surface k1 of the nut body for cutter connection 13 in the metallic contact. Besides, it comes to be supported auxiliary by the joint force of the collet 2.

Other points apply correspondingly to the previous example.

According to the above-mentioned invention, the following effects are acquired.

The passage through-hole of the tool holder main body can communicate with the cutting fluid path of the cutter airtightly through the cylindrical male surface part for sealing, the cylindrical female surface part for sealing and the ring-shaped packing. Therefore, even if the longitudinal relative displacement of the cylindrical male surface part for sealing and the cylindrical female surface part for sealing arises, as long as the ring-shaped packing exists among these, regardless of the pushing force to the back of the cylindrical male surface part for sealing, the communicating state can be held good. Therefore, cutting fluid supplied into the passage through-hole during machining a work due to the cutter is certainly prevented from leaking out from the connecting part of the tool driver and the cutter.

The protrude length from the front end of the holder main body of the cutter can be changed optionally by changing the front and rear positions of the tool. Besides, according to this tool driver, action and effect which aims in the invention related to the tool holder can be remarkably realized.

What is claimed is:

1. A tool holder for machine tool comprising:

a tool holder main body (1) having a passage through-hole (e) at a rotating center part (X), a cutter (10) having a cutting fluid path (e5) which is inserted into an anterior part of said passage through-hole (e), and said cutter (10) being fixed on a tip of the tool holder main body (1) through a fixing means (3);

wherein plural guiding grooves (d) parallel to a spindle direction on an inner peripheral surface of a through-hole (a3) at the rotating center part (X) of the tool holder main body (1), a tool driver (6) regulating relative rotation to said tool holder main body (1) and adjusting front and rear positions by sliding along the spindle direction is incorporated, a partial passage through-hole of a part of the passage through-hole (e) is formed to the rotating center part (X) of the tool driver (6), a cylindrical male surface part for sealing (10b) is formed at a rear-outer peripheral part of the cutter (10), a male surface part for regulating rotation (10a) comprising plane surface bodies which a fixed range of a peripheral surface is cut is formed at a front side of the cylindrical male surface part for sealing (10b), half-moon shaped plane parts (j) are formed at a front edge of the male surface part for regulating rotation (10a), a cylindrical female surface part for sealing (e3a) to seal up the cylindrical male surface part for sealing (10b) of the cutter and a fitting female part (e3b) regulating relative rotation by fitting the plane surface bodies of the male surface part for regulating rotation (10a) are formed to a front-inner peripheral part of the partial passage through-hole of the tool driver (6), a barrier surface (k) of the fitting female part (e3b) is contacted to the half-moon shaped plane parts (j) to regulate a longitudinal relative displacement, a ring groove (h) is formed on an inner peripheral surface of the cylindrical female surface part for sealing (e3a), and a ring-shaped packing (12) for sealing an annular clearance between the cylindrical male surface part for sealing (10b) and the cylindrical female surface part for sealing (e3a) is fitted into the ring groove (h).

2. A tool holder for machine tool comprising:

a tool holder main body (1) having a passage through-hole (e) at a rotating center part (X), a cutter (10) having a cutting fluid path (e5) which is inserted into an anterior part of said passage through-hole (e), and said cutter (10) being fixed on a tip of the tool holder main body (1) through a fixing means (3);

wherein plural guiding grooves (d) parallel to a spindle direction on an inner peripheral surface of a through-hole (a3) at the rotating center part (X) of the tool holder main body (1), a tool driver (6) regulating relative rotation to said tool holder main body (1) and adjusting front and rear positions by sliding along the spindle direction is incorporated, a partial passage through-hole of a part of the passage through-hole (e) is formed to the rotating center part (X) of the tool driver (6), a cylindrical male surface part for sealing (10b) is formed at a rear-outer peripheral part of the cutter (10), a groove part for regulating longitudinal move (10c) comprising plane surfaces (n) which a fixed range of a peripheral surface is cut in a concave-shaped and half-moon shaped plane parts (j2) which are formed at front and rear edges of the plane surfaces (n) is formed at a front side of the cylindrical male surface part for sealing (10b), a cylindrical female surface part for sealing (e3a) to seal up the cylindrical male surface part for sealing (10b) of the cutter and a fitting female part (e3b) regulating relative rotation by engaging with a concave of the groove part for regulating longitudinal move (10c) are formed to a front-inner peripheral part of the partial passage through-hole of the tool driver (6), a barrier surface (k) of the fitting female part (e3b) is contacted to the half-moon shaped plane parts (j2) to regulate a longitudinal relative displacement, a ring groove (h) is formed on an inner peripheral surface of the cylindrical female surface part for sealing (e3a), and a ring-shaped packing (12) for sealing an annular clearance between the cylindrical male surface part for sealing (10b) and the cylindrical female surface part for sealing (e3a) is fitted into the ring groove (h).

3. A tool driver used in the tool holder for machine tool of claim 1, wherein the partial passage through-hole of the tool driver (6) is communicated with the rotating center part (X) of the holder main body (1), a cylindrical female surface part for sealing (e3a) allowing the cylindrical male surface part for sealing (10b) of the rear end of the cutter to be airtightly inserted to the anterior part of the partial passage through-hole through an O ring or its equivalent (12) is formed, the fitting female part (e3b) which the longitudinal relative displacement is regulated by engaging with the male surface part for regulating rotation (10a) comprising the plane surface bodies which a fixed range of the peripheral surface of the cutter is cut is formed, the barrier surface (k) of the fitting female part (e3b) which the longitudinal relative rotation is regulated by fitting to the half-moon shaped plane part of the cutter is formed, a ring-shaped packing (9a) allowing a cutting fluid communicating tube (8) to be airtightly inserted is fitted on a posterior part of the partial passage through-hole, and a driver pin (7) engaging with the guiding groove (d) engraved on an inner peripheral surface of a through-hole (a3) of the holder main body (1) is provided in a center of an outer peripheral surface part thereof.

4. A tool driver used in the tool holder for machine tool of claim 1, wherein the partial passage through-hole of the tool driver (6) is communicated with the rotating center part (X) of the holder main body (1), a cylindrical female surface part for sealing (e3a) allowing the cylindrical male surface part for sealing (10b) of the rear end of the cutter to be airtightly inserted to the anterior part of the partial passage through-hole through an O ring or its equivalent (12) is formed, the fitting female part (e3b) which engages with the groove part for regulating longitudinal move (10c) comprising the plane surfaces (n) and the half-moon shaped plane parts (j2) which a fixed range part of the peripheral surface of the cutter is cut in concave-shaped and regulates the relative rotation is formed, the barrier surfaces (k1) of the fitting female part (e3b) which the longitudinal relative rotation is regulated by fitting to the half-moon shaped plane parts of the cutter respectively are formed, a ring-shaped packing (9a) allowing a cutting fluid communicating tube (8) to be airtightly inserted is fitted on a posterior part of the partial passage through-hole, and a driver pin (7) engaging with the guiding groove (d) engraved on an inner peripheral surface of a through-hole (a3) of the holder main body (1) is provided in a center of an outer peripheral surface part thereof.

* * * * *